United States Patent
Dhuse et al.

(10) Patent No.: US 11,226,764 B2
(45) Date of Patent: Jan. 18, 2022

(54) CONSISTENT READS IN A DISTRIBUTED TRANSACTION PROTOCOL

(71) Applicant: INTERNATIONAL BUSINESS MACHINES CORPORATION, Armonk, NY (US)

(72) Inventors: Gregory R. Dhuse, Chicago, IL (US); Ravi Khadiwala, Bartlett, IL (US); Mingyu Li, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 86 days.

(21) Appl. No.: 16/744,448

(22) Filed: Jan. 16, 2020

(65) Prior Publication Data
US 2021/0223984 A1 Jul. 22, 2021

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01)
(58) Field of Classification Search
None
See application file for complete search history.

(56) References Cited

U.S. PATENT DOCUMENTS

| 7,644,238 B2 | 1/2010 | Carrie |
| 7,677,441 B2 | 3/2010 | Bernstein et al. |
| 8,949,614 B1 * | 2/2015 | Jernigan, IV ....... H04L 67/1097 713/178 |
| 8,990,177 B2 | 3/2015 | Junqueira et al. |
| 9,195,600 B2 | 11/2015 | Adl-Tabatabai et al. |

(Continued)

FOREIGN PATENT DOCUMENTS

EP 0458564 B1 1/1998

OTHER PUBLICATIONS

Dragojevic et al., "No compromises: distributed transactions with consistency, availability, and performance", Microsoft Research, Symposium on Operating Systems Principles (SOSP'15), Oct. 2015, ACM, https://www. microsoft.com/en-us/research/wp-content/uploads/2016/02/SOSP15-final227.pdf, 17 pages.

(Continued)

*Primary Examiner* — Brian R Peugh
(74) *Attorney, Agent, or Firm* — Anthony England; Andrew D. Wright; Roberts Calderon Safran & Cole, P.C.

(57) ABSTRACT

Methods and systems for consistent reads in a distributed transaction protocol are disclosed. A method includes: receiving, by a computing device, a request to write a revision of a data object in a dispersed storage network (DSN); sending, by the computing device, a proposal with the revision of the data object to a plurality of storage units; receiving, by the computing device, a response to the proposal from each of the plurality of storage units, the response including a proposed minimum timestamp corresponding to the data object; determining, by the computing device, a minimum timestamp for the data object based on the proposed minimum timestamps received from the plurality of storage units; and determining, by the computing device, a version of the data object written in the DSN based on the minimum timestamp.

20 Claims, 6 Drawing Sheets

(56) References Cited

U.S. PATENT DOCUMENTS

| | | | |
|---|---|---|---|
| 9,852,151 B1 * | 12/2017 | Youngworth | ......... G06F 3/0619 |
| 10,114,837 B2 | 10/2018 | Larson et al. | |
| 10,977,189 B2 * | 4/2021 | Conklin | .............. G06F 12/1018 |
| 2011/0055662 A1 | 3/2011 | Grube et al. | |

OTHER PUBLICATIONS

Mell et al., "The NIST Definition of Cloud Computing", NIST, Special Publication 800-145, Sep. 2011, 7 pages.
Weisinger, "Technology: Dispersed Storage", https://formtek.com/blog/technology-dispersed-storage/, accessed Sep. 11, 2008, 3 pages.
Musthaler, "It slices! It dices! It stores your data securely * Cleversafe's commercial version of its Dispersed Storage Network(dsNet)", Mar. 31, 2008, 6 pages.

* cited by examiner

CONSISTENT READS IN A DISTRIBUTED TRANSACTION PROTOCOL

BACKGROUND

Aspects of the present invention generally relate to computing devices and, more particularly, to methods and systems for consistent reads in a distributed transaction protocol.

Computing devices communicate data, process data, and/or store data. Such computing devices range from wireless smart phones, laptops, tablets, personal computers (PCs), work stations, and video game devices, to data centers that support millions of web searches, stock trades, or online purchases every day. A computer may effectively extend its central processing unit (CPU) by using cloud computing to perform one or more computing functions (e.g., a service, an application, an algorithm, an arithmetic logic function, etc.) on behalf of the computer. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Further, for large services, applications, and/or functions, cloud computing may be performed by multiple cloud computing resources in a distributed manner to improve the response time for completion of the service, application, and/or function. For example, Hadoop® (a registered trademark of The Apache Software Foundation) is an open source software framework that supports distributed applications enabling application execution by thousands of computers. Network storage is a computing capability that is typically offered by cloud computing providers. In particular, a user of cloud computing services may store and retrieve data on cloud infrastructure maintained by a cloud computing provider, such as a dispersed storage network (DSN) system. A computer may use cloud storage as part of its memory system. Cloud storage enables a user, via a computer, to store files, applications, etc., on an Internet storage system. The Internet storage system may include a redundant array of independent disks (RAID) system and/or a dispersed storage system (dispersed storage network memory) that uses an error correction scheme to encode data for storage.

SUMMARY

In a first aspect of the invention, there is a method that includes: receiving, by a computing device, a request to write a revision of a data object in a dispersed storage network (DSN); sending, by the computing device, a proposal with the revision of the data object to a plurality of storage units; receiving, by the computing device, a response to the proposal from each of the plurality of storage units, the response including a proposed minimum timestamp corresponding to the data object; determining, by the computing device, a minimum timestamp for the data object based on the proposed minimum timestamps received from the plurality of storage units; and determining, by the computing device, a version of the data object written in the DSN based on the minimum timestamp.

In another aspect of the invention, there is a computer program product that includes one or more computer readable storage media, and program instructions collectively stored on the one or more computer readable storage media. The program instructions include: program instructions to receive a read request for a data object, the read request including a request timestamp; program instructions to determine a current timestamp; program instructions to retrieve data from storage corresponding to the data object at the request timestamp; program instructions to update a read timestamp cache based on the current timestamp; and program instructions to provide the retrieved data to a dispersed storage (DS) processing unit.

In another aspect of the invention, there is a system that includes a hardware processor, a computer readable memory, and one or more computer readable storage media associated with a computing device, wherein the computing device is a dispersed storage (DS) processing unit; program instructions to receive a request to write a revision of a data object in a dispersed storage network (DSN); program instructions to send a proposal with the revision of the data object to a plurality of storage units; program instructions to receive a response to the proposal from each of the plurality of storage units, the response including a proposed minimum timestamp corresponding to the data object; program instructions to determine a minimum timestamp for the data object based on the proposed minimum timestamps received from the plurality of storage units; and program instructions to determine a version of the data object written in the DSN based on the minimum timestamp, wherein the program instructions are collectively stored on the one or more computer readable storage media for execution by the hardware processor via the computer readable memory.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
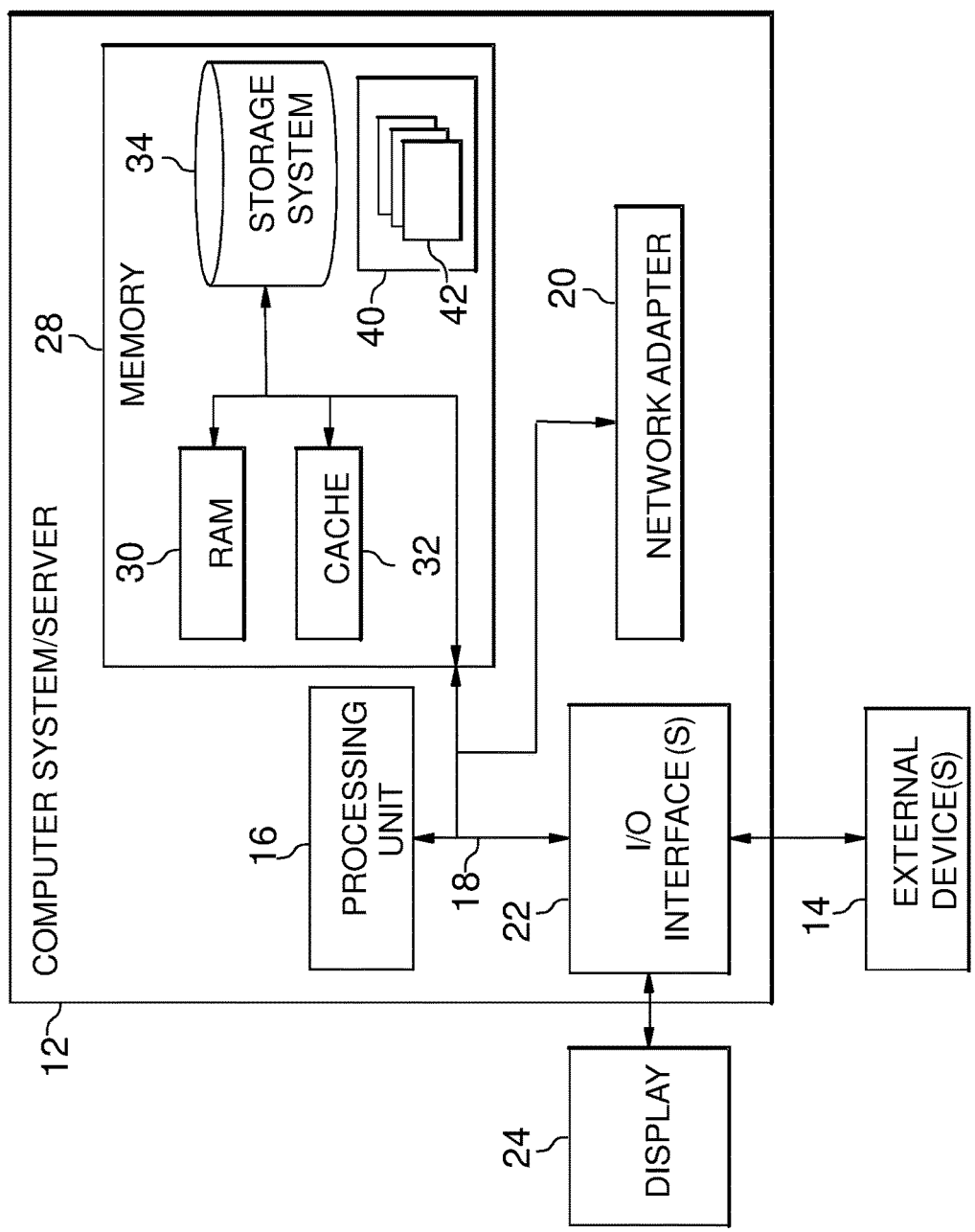
FIG. 1 depicts a cloud computing node according to an embodiment of the present invention.

Aspects of the present invention generally relate to computing devices and, more particularly, to methods and systems for consistent reads in a distributed transaction protocol. As described herein, aspects of the invention include a method and system that enable a distributed transaction protocol for reading multiple sources (objects) consistently in a DSN by issuing, from a dispersed storage (DS) processing unit, multiple read requests with a particular timestamp, and reading, by a DS storage unit, a highest revision (version) with a timestamp less than or equal to the particular timestamp. Aspects of the invention also include a method and system that enable a distributed transaction protocol that, after a client has restored a particular revision of a source, prevents writing in the DSN of any revision of that source that is lower than or equal to the particular revision that was restored.

Embodiments address problems with consistency in a DSN. In particular, embodiments address problems with particular revisions of sources being changed after having been read/restored by a client. Accordingly, embodiments improve the functioning of a computer by providing methods and systems for immediately consistent reads in a distributed transaction protocol. In particular, embodiments improve the functioning of a computer by providing a method and system that enable a distributed transaction protocol for reading multiple sources consistently in a DSN by issuing, from a DS processing unit, multiple read requests with a particular timestamp, and reading, by a DS storage unit, a highest revision with a timestamp less than or equal to the particular timestamp. Embodiments also improve the functioning of a computer by providing a method and system that enable a distributed transaction protocol that, after a client has restored a particular revision of a source, preserves consistency by preventing writing in the DSN of any revision of that source that is lower than or equal to the particular revision that was restored. Additionally, implementations of the invention use techniques that are, by definition, rooted in computer technology (e.g., DSNs, DS processing units, DS storage units, and cloud computing).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
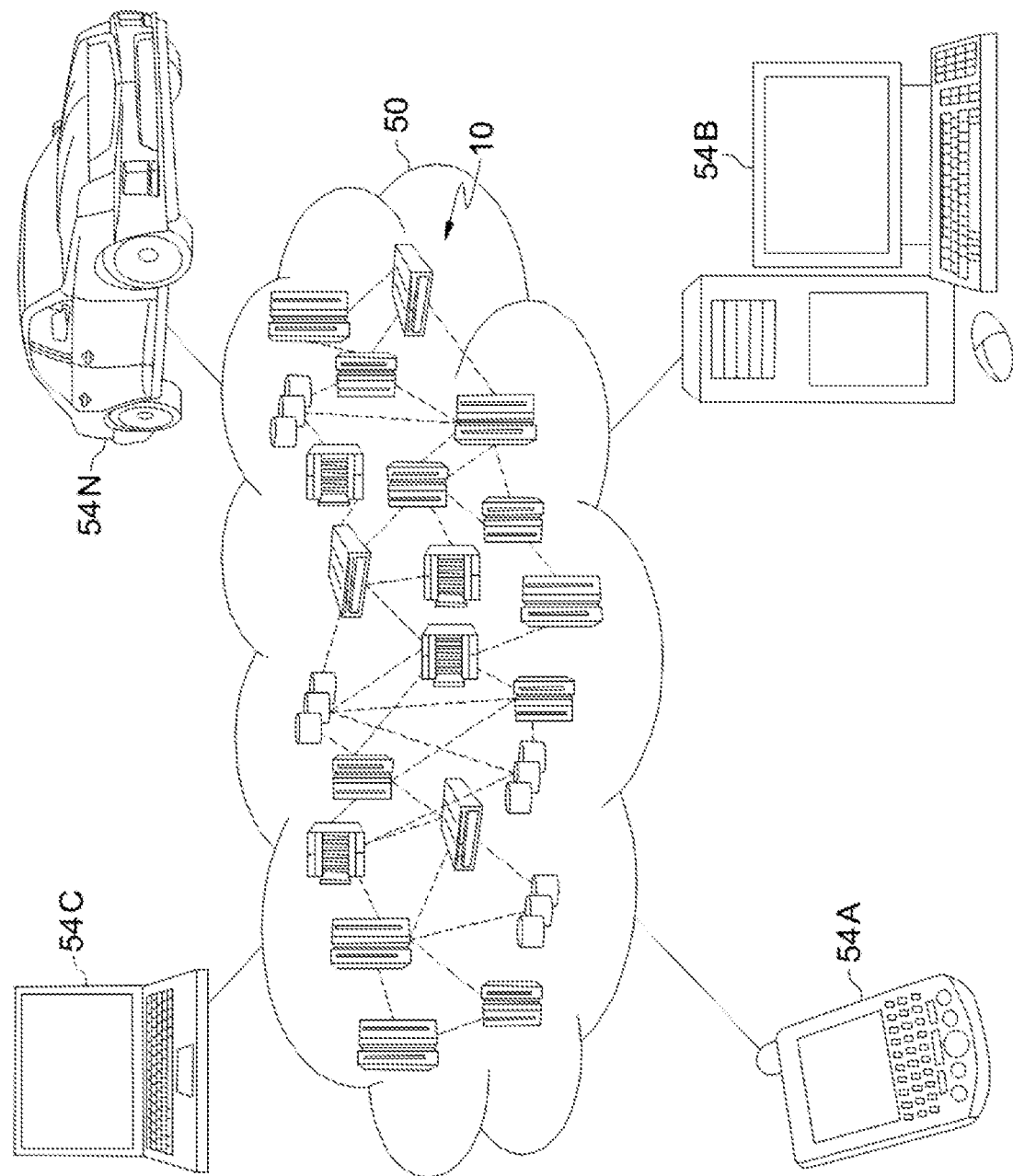
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
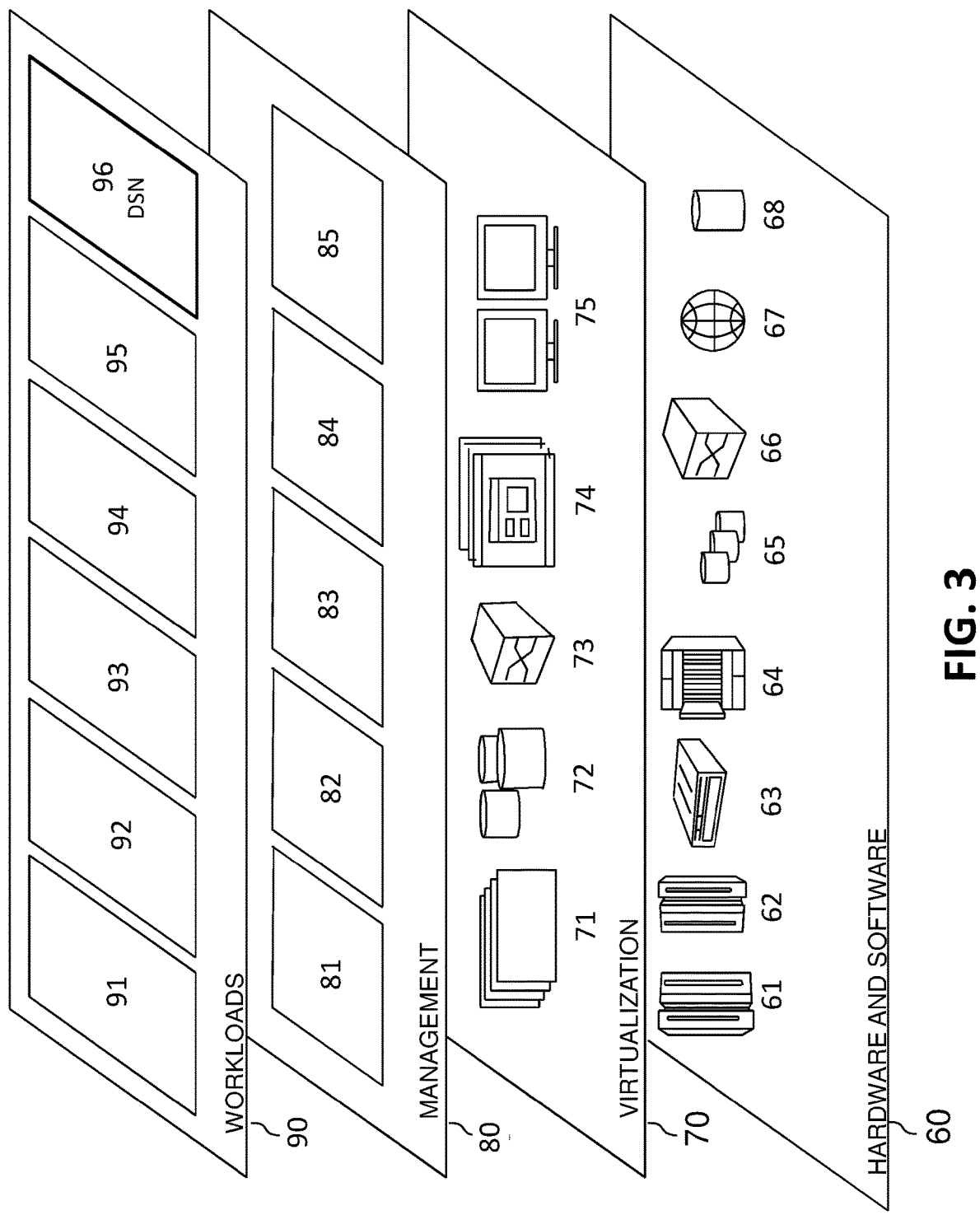
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and DSN 96.

Referring back to FIG. 1, the program/utility 40 may include one or more program modules 42 that generally carry out the functions and/or methodologies of embodiments of the invention as described herein (e.g., such as the functionality provided by DSN 96). Specifically, the program modules 42 may enable a distributed transaction protocol for reading multiple sources consistently. Additionally, the program modules 42 may prevent writing of any revision of a source that is lower than or equal to the highest revision that has been read/restored by a client. Other functionalities of the program modules 42 are described further herein such that the program modules 42 are not limited to the functions described above. Moreover, it is noted that some of the program modules 42 can be implemented within the infrastructure shown in FIGS. 1-3. For example, the program modules 42 may be representative of a DS processing unit program module 420 and a DS storage unit program module 440 as shown in FIG. 4.

Figure 4:
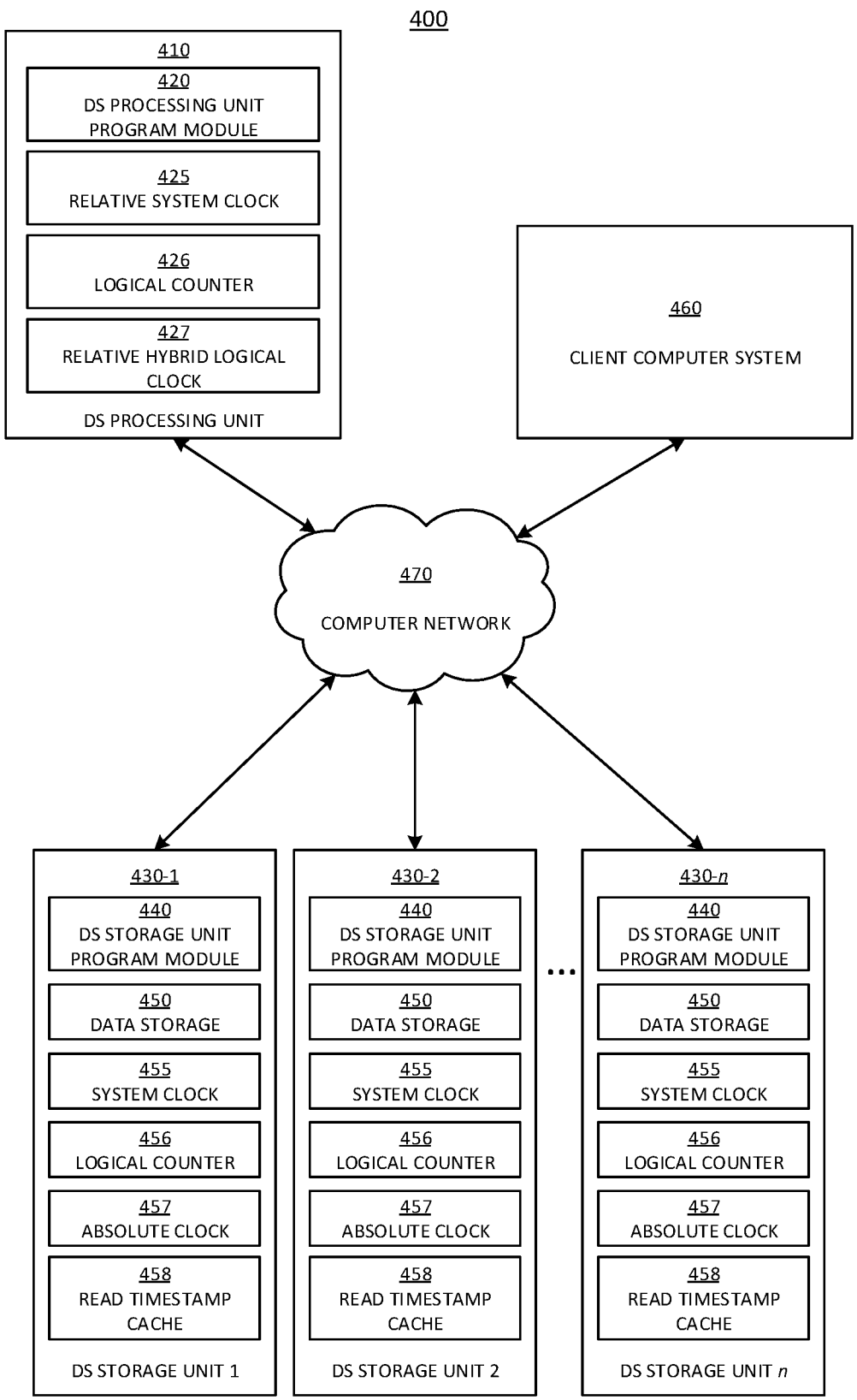
FIG. 4 depicts an illustrative environment in accordance with aspects of the invention.

FIG. 4 depicts an illustrative environment 400 in accordance with aspects of the invention. As shown, the environment 400 comprises at least one DS processing unit 410, a plurality of DS storage units 430-1, 430-2, . . . , 430-n, and a client computer system 460 which are in communication via a computer network 470. In embodiments, the computer network 470 is any suitable network including any combination of a LAN, WAN, or the Internet. In embodiments, the DS processing unit 410, the plurality of DS storage units 430-1, 430-2, . . . , 430-n, and the client computer system 460 are physically collocated, or, more typically, are situated in separate physical locations.

The quantity of devices and/or networks in the environment 400 is not limited to what is shown in FIG. 4. In practice, the environment 400 may include additional devices and/or networks; fewer devices and/or networks; different devices and/or networks; or differently arranged devices and/or networks than illustrated in FIG. 4. Also, in some implementations, one or more of the devices of the environment 400 may perform one or more functions described as being performed by another one or more of the devices of the environment 400.

In embodiments, the DS processing unit 410 in the environment 400 is situated in the cloud computing environment 50 and is one or more of the nodes 10 shown in FIG. 2. The DS processing unit 410 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, the DS processing unit 410 includes a DS processing unit program module 420 which comprises one or more of the program modules 42 shown in FIG. 1. In embodiments, the DS processing unit program module 420 includes program instructions for storing data objects (sources) and retrieving data objects using the plurality of DS storage units 430-1, 430-2, . . . , 430-n, as discussed herein. In embodiments, the program instructions included in the DS processing unit program module 420 of the DS processing unit 410 are executed by one or more hardware processors. In embodiments, the DS processing unit 410 also includes a relative system clock 425, a logical counter 426, and a relative hybrid logical clock 427, each of which may be implemented using any type of memory (e.g., RAM) or storage device (e.g., hard disk drive, solid state drive, etc.) and/or one or more of the program modules 42 including program instructions that are executed by one or more hardware processors.

Still referring to FIG. 4, in embodiments, each of the plurality of DS storage units 430-1, 430-2, . . . , 430-n in the environment 400 is situated in the cloud computing environment 50 and is one or more of the nodes 10 shown in FIG. 2. Each of the plurality of DS storage units 430-1, 430-2, . . . , 430-n is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3.

In embodiments, each of the plurality of DS storage units 430-1, 430-2, . . . , 430-n includes a DS storage unit program module 440 and a data storage 450. In an example, the DS storage unit program module 440 comprises one or more of the program modules 42 shown in FIG. 1. In embodiments, the DS storage unit program module 440 includes program instructions for storing slices of data objects and retrieving slices of data objects in the data storage 450 in accordance with instructions received from the DS processing unit program module 420 of the DS processing unit 410.

In embodiments, the data storage 450 receives and stores data in accordance with instructions received from the DS storage unit program module 440. The data storage 450 is any type of data storage device or system (e.g., storage device 65 of FIG. 3) and is located on (or is accessible to) the data storage unit 430-1, 430-2, . . . , 430-n. In other embodiments, the data storage 450 is a storage resource provided by a cloud computing provider on another cloud computing node 10 or other location associated with the cloud computing provider that is external to but accessible from the data storage unit 430-1, 430-2, . . . , 430-n.

In embodiments, each of the plurality of DS storage units 430-1, 430-2, . . . , 430-n also includes a system clock 455, a logical counter 456, an absolute clock 457, and a read timestamp cache 458, each of which may be implemented using any type of memory (e.g., RAM) or storage device (e.g., hard disk drive, solid state drive, etc.) and/or one or more of the program modules 42 including program instructions that are executed by one or more hardware processors.

Still referring to FIG. 4, in embodiments, the client computer system 460 in the environment 400 includes one or more components of the computer system/server 12 (as shown in FIG. 1). In other embodiments, the client computer system 460 in the environment 400 is situated in the cloud computing environment 50 and is one or more of the nodes 10 shown in FIG. 2. In an example, the client computer system 460 is implemented as hardware and/or software using components such as mainframes 61; RISC (Reduced Instruction Set Computer) architecture based servers 62; servers 63; blade servers 64; storage devices 65; networks and networking components 66; virtual servers 71; virtual storage 72; virtual networks 73, including virtual private networks; virtual applications and operating systems 74; and virtual clients 75 shown in FIG. 3. In other embodiments, the client computer system 460 is a desktop computer, a laptop computer, a mobile device such as a cellular phone, tablet, personal digital assistant (PDA), or any other computing device.

In embodiments, to read multiple sources consistently, the DS processing unit 410 issues multiple read requests with the same client timestamp Tc, as described below with reference to FIG. 5. For each read, the DS processing unit 410 issues requests with Tc and ensures that either the highest revision less than or equal to Tc or the appropriate error is returned. In embodiments, when a quorum of DS storage units 430-1, 430-2, . . . , 430-n cannot service a read at a particular timestamp Tc because old data has already been discarded, the DS processing unit 410 determines that the read is prehistoric. In embodiments, in the case that any read fails with a prehistoric read error, the DS processing unit 410 aborts and retries the entire transaction. In embodiments, for point-in-time reads where a user (e.g., of the client computer system 460) specifies Tc explicitly, any prehistoric read errors are returned to the user.

In embodiments, once a client such as the client computer system 460 has restored (read) a revision R of a source stored in the data storage units 430-1, 430-2, . . . , 430-n, the DS processing unit 410 prohibits the writing of any revision less than or equal to R of that source to the data storage units 430-1, 430-2, . . . , 430-n. In other words, the DS processing unit 410 prohibits the writing of a version of a source with a timestamp that is the same as or earlier than the timestamp of a version of the source that has been restored by a client such as the client computer system 460. In this manner, the DS processing unit 410 guarantees that two reads of a source at any timestamp T by clients such as the client computer system 460 always produce the same result, and the history of the source never changes.

In embodiments, each of the at least one DS processing unit 410 maintains the relative hybrid logical clock 427, which is used to generate new timestamp revisions for writes. Each of the DS storage units 430-1, 430-2, . . . , 430-n maintains a read timestamp cache 458 which includes the most recent read timestamp for each source stored in the data storage 450. In embodiments, in order to prevent the read timestamp cache 458 from growing too large, the DS storage units 430-1, 430-2, . . . , 430-n estimate the last read time of a given SliceName in a conservative manner. In other words, the DS storage units 430-1, 430-2, . . . , 430-n may return a more recent timestamp than the true timestamp but not an older timestamp. In embodiments, if the DS storage units 430-1, 430-2, . . . , 430-n return a more recent timestamp than the true timestamp, unnecessary write retries may result. Accordingly, more space may be allocated to the read timestamp cache 458 if performance considerations are more important than space considerations, and less space may be allocated to the read timestamp cache 458 if space considerations are more important than performance considerations.

In embodiments, the DS storage units 430-1, 430-2, . . . , 430-n distinguish a last retained revision (i.e., earliest retained revision) for each source, including a prehistoric timestamp revision indicating a point where older promoted revisions have been removed in read/propose response. In embodiments, DS storage units 430-1, 430-2, . . . , 430-n that do not maintain history may safely add the prehistoric revision to any source where the predecessor of the oldest known revision is greater than not-found.

In embodiments, each of the at least one DS processing unit 410 and the DS storage units 430-1, 430-2, . . . , 430-n participate in contests that include two decisions regarding sources: MIN-TIMESTAMP (minimum timestamp), which is a consensus on a smallest (earliest) acceptable revision of a source that can win the contest (single-source, replicated decision); and WINNING-SUCCESSOR, which is a decision on the exact revision of a source to accept, limited by the result of MIN-TIMESTAMP. In embodiments, each decision has its own votes with its own set of rounds. In particular, each of the at least one DS processing unit 410 makes proposals for both the MIN-TIMESTAMP and WINNING-SUCCESSOR decisions. In embodiments, on each of the DS storage units 430-1, 430-2, . . . , 430-n, the read timestamp cache 458 is updated whenever a client such as client computer system 460 issues a timestamp read. In embodiments, the read timestamp cache 458 allows most reads to proceed without opening a contest or making any proposals. To that end, in embodiments, when a new contest is created on one of the DS storage units 430-1, 430-2, . . . , 430-n, the DS storage unit 430-1, 430-2, . . . , 430-n automatically votes for the current value of its read timestamp cache 458 in round 0 of the MIN-TIMESTAMP decision unless the first proposal is a MIN-TIMESTAMP proposal for a higher timestamp or in a round greater than 0.

In embodiments, since the WINNING-SUCCESSOR decision depends on the chosen MIN-TIMESTAMP, the at least one DS processing unit 410 resolves the MIN-TIMESTAMP vote before deciding the WINNING-SUCCESSOR. In embodiments, the minimum timestamp is chosen on a per-source basis (i.e., per DS storage unit 430-1, 430-2, . . . , 430-n), while the winning successor must win on all of its sources (i.e., all of the storage units 430-1, 430-2, . . . , 430-n). In embodiments, votes by the DS storage units 430-1, 430-2, . . . , 430-n based on timestamps stored in the read timestamp cache 458 will typically allow the MIN-TIMESTAMP decision to be made immediately, so a writer can still succeed in one round-trip time. When there is a read-write conflict, however, writers may need to propose a MIN-TIMESTAMP in the appropriate voting round in order to resolve the decision. When choosing the minimum timestamp to propose, the at least one DS processing unit 410 selects the largest revision in order to guarantee that the revision set in the read timestamp cache 458 is honored.

In embodiments, after the MIN-TIMESTAMP is decided, the at least one DS processing unit 410 resolves the WINNING-SUCCESSOR vote, with the constraint that any proposals with a revision less than or equal to the chosen MIN-TIMESTAMP cannot win. In embodiments, if a writer's own proposal is below this minimum timestamp and if there is no other proposal to push forward, the write fails with a late write error and retries with a higher WINNING-SUCCESSOR revision.

In embodiments, when a reader at timestamp T successfully updates the read timestamp cache 458 on the DS storage units 430-1, 430-2, ..., 430-*n* without a contest for the incumbent revision, the reader knows that some timestamp greater than or equal to T will win MIN-TIMESTAMP vote, so the reader can fallback without making any proposals that would open that contest. On the other hand, in embodiments, if the reader fails to update the read timestamp cache 458, the reader drives the MIN-TIMESTAMP vote to completion by opening a new contest and resolving the MIN-TIMESTAMP decision. If the chosen MIN-TIMESTAMP is greater than or equal to T for the current incumbent revision, the reader can safely restore the incumbent. Otherwise, the reader pushes the contest to completion before returning. Because a reader may encounter an open contest with no restorable proposals, the reader may re-propose the existing incumbent data at a new timestamp greater than or equal to T in order to proceed.

Figure 5:
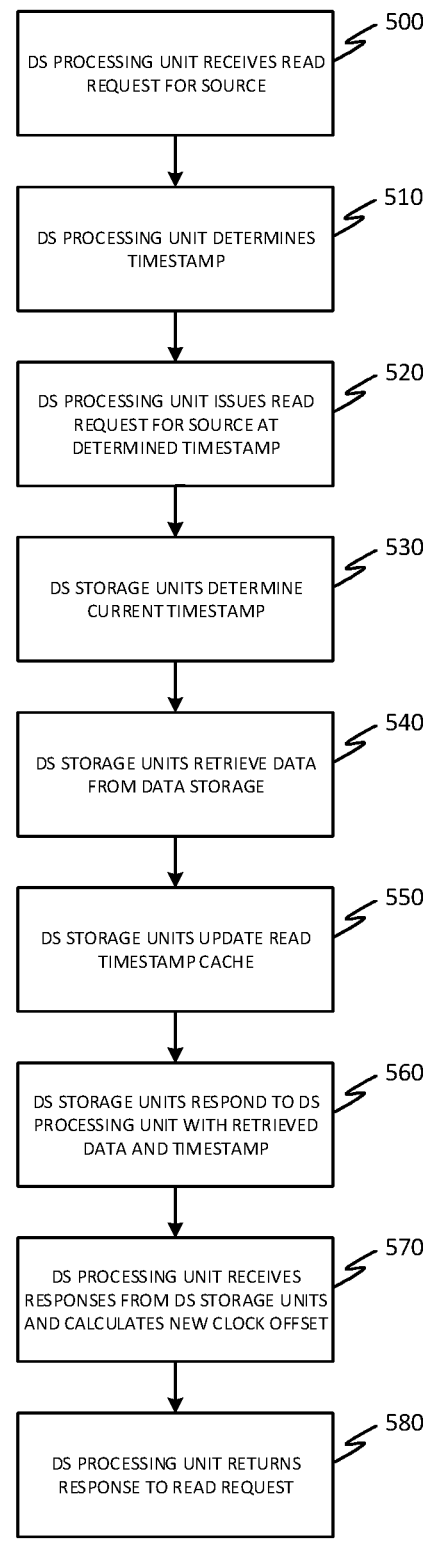
FIGS. 5 and 6 depict flowcharts of exemplary methods performed in accordance with aspects of the invention.

FIG. 5 depicts a flowchart of an exemplary method for reading multiple sources (data objects) consistently in a DSN. The method of FIG. 5 is performed by the DS processing unit program module 420 of the DS processing unit 410 and the DS storage unit program module 440 of the DS storage units 430-1, 430-2, ..., 430-*n* in accordance with aspects of the invention. The steps of the method are performed in the environment of FIG. 4 and are described with reference to the elements shown in FIG. 4.

At step 500, the DS processing unit 410 receives a read request for a source. In embodiments, the DS processing unit program module 420 of the DS processing unit 410 receives a request, from the client computer system 460, to perform a consistent read of a source (data object) S, which is stored across a plurality of the DS storage units 430-1, 430-2, ..., 430-*n*. In embodiments, the data storage 450 of each of the DS storage units 430-1, 430-2, ..., 430-*n* stores one or more slices, a plurality of which make up the source S. In embodiments, the request received from the client computer system 460 optionally includes a desired read timestamp.

Still referring to FIG. 5, at step 510, the DS processing unit 410 determines a timestamp. In embodiments, the DS processing unit program module 420 of the DS processing unit 410 determines a timestamp Tc for the read request using the relative hybrid logical clock 427. In embodiments, the relative hybrid logical clock 427 is a hybrid logical clock that provides ordering of events based on the relative system clock 425 and the logical counter 426. In other embodiments, in the case that the read request received at step 500 includes the desired read timestamp, the DS processing unit 410 determines the timestamp Tc based on the desired read timestamp.

Still referring to FIG. 5, at step 520, the DS processing unit 410 issues a read request for the source at the determined timestamp. In embodiments, the DS processing unit program module 420 of the DS processing unit 410 issues the read request for the source S at the timestamp Tc determined at step 510 to a plurality of the DS storage units 430-1, 430-2, ..., 430-*n*.

Still referring to FIG. 5, at step 530, the DS storage units 430-1, 430-2, ..., 430-*n* determine a current timestamp. In embodiments, the DS storage unit program module 440 of the DS storage units 430-1, 430-2, ..., 430-*n*, in response to receiving the read request issued by the DS processing unit 410 at step 520, determines a current timestamp Ts using the absolute clock 457. In embodiments, the absolute clock 457 is a clock that provides ordering of events based on the system clock 455 and the logical counter 456. In embodiments, at step 530, the DS storage unit program module 440 of the DS storage units 430-1, 430-2, ..., 430-*n* also determines clock skew based on the difference between Tc and Ts. In embodiments, in the event that |Ts−Tc| is larger than a predetermined maximum acceptable skew, the DS storage unit program module 440 of the DS storage units 430-1, 430-2, ..., 430-*n* rejects the read request issued by the DS processing unit 410 at step 520.

Still referring to FIG. 5, at step 540, the DS storage units 430-1, 430-2, ..., 430-*n* retrieve data from data storage 450. In embodiments, the DS storage unit program module 440 of the DS storage units 430-1, 430-2, ..., 430-*n*, in response to the read request issued by the DS processing unit program module 420 of the DS processing unit 410 at step 520, reads the source S at time Tc from the data storage 450, which includes retrieving at least (1) all open contents with incumbent revision<Tc and (2) the highest promoted revision<=Tc.

Still referring to FIG. 5, at step 550, the DS storage units 430-1, 430-2, ..., 430-*n* update the read timestamp cache 458. In embodiments, the DS storage unit program module 440 of the DS storage units 430-1, 430-2, ..., 430-*n* update the read timestamp cache 458. In particular, in the read timestamp cache 458, the DS storage unit program module 440 sets a value at an array index or other location corresponding to the source S to the maximum of the value stored at that index and Tc. In other words, the DS storage unit program module 440 sets cache[S]=max(cache[S], Tc) in the read timestamp cache 458.

Still referring to FIG. 5, at step 560, the DS storage units 430-1, 430-2, ..., 430-*n* respond to the DS processing unit 410 with the data retrieved at step 540 and the timestamp Ts determined at step 530. In embodiments, the DS storage unit program module 440 of the DS storage units 430-1, 430-2, ..., 430-*n* responds to the DS processing unit 410 with the data retrieved at step 540 and the timestamp Ts determined at step 530.

Still referring to FIG. 5, at step 570, the DS processing unit 410 receives the responses from the DS storage units 430-1, 430-2, ..., 430-*n* from step 560 and calculates a new clock offset. In embodiments, the DS processing unit program module 420 of the DS processing unit 410 receives the responses from the DS storage unit program module 440 of the DS storage units 430-1, 430-2, ..., 430-*n* from step 560, calculates a new estimated clock offset using the received timestamps Ts from step 560, and updates the relative hybrid logical clock 427 using the estimated clock offset.

Still referring to FIG. 5, at step 580, the DS processing unit 410 returns a response to the read request from step 500. In embodiments, the DS processing unit program module 420 of the DS processing unit 410 uses the responses received from the DS storage unit program module 440 of the DS storage units 430-1, 430-2, ..., 430-*n* at step 560 to generate a response to the read request from step 500 and return the response to the client computer system 460.

Figure 6:
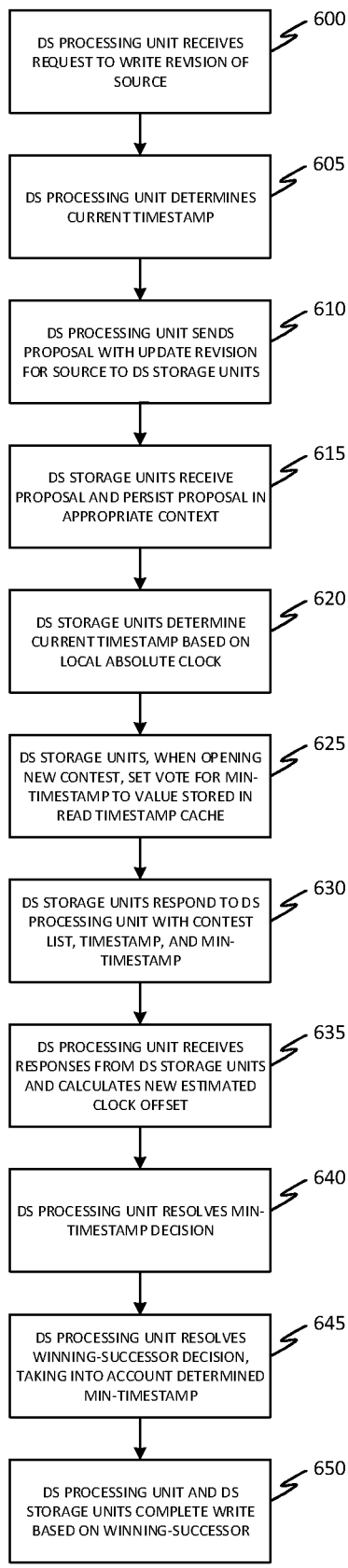

FIG. 6 depicts a flowchart of an exemplary method for writing a revision of a source (data object) in a DSN. The method of FIG. 6 is performed by the DS processing unit program module 420 of the DS processing unit 410 and the DS storage unit program module 440 of the DS storage units 430-1, 430-2, ..., 430-*n* in accordance with aspects of the invention. The steps of the method are performed in the environment of FIG. 4 and are described with reference to the elements shown in FIG. 4.

At step 600, the DS processing unit 410 receives a request to write a revision of a source. In embodiments, the DS processing unit program module 420 of the DS processing unit 410 receives a request, from the client computer system 460, to write a revision of a source (data object) S. In embodiments, the revision of the source S is a different (e.g., newer) version of the source S (e.g., an updated version of a data object that was edited, revised, or otherwise changed by the client computer system 460) that is to be divided into a plurality of slices by the DS processing unit 410 and stored across the plurality of the DS storage units 430-1, 430-2, . . . , 430-n in the data storage 450.

Still referring to FIG. 6, at step 605, the DS processing unit 410 determines a current timestamp. In embodiments, the DS processing unit program module 420 of the DS processing unit 410 determines a current timestamp Tc for the write request using the relative hybrid logical clock 427.

Still referring to FIG. 6, at step 610, the DS processing unit 410 sends a proposal with an update revision for the source to the DS storage units 430-1, 430-2, . . . , 430-n. In embodiments, the DS processing unit program module 420 of the DS processing unit 410 sends the proposal P with the update revision for the source S, including the current timestamp Tc determined at step 605 and a client ID corresponding to the client computer system 460 from which the request was received at step 600, to the DS storage unit program module 440 of the DS storage units 430-1, 430-2, . . . , 430-n.

Still referring to FIG. 6, at step 615, the DS storage units 430-1, 430-2, . . . , 430-n receive the proposal and persist the proposal in the appropriate context. In embodiments, the DS storage unit program module 440 of the DS storage units 430-1, 430-2, . . . , 430-n receives the proposal sent by the DS processing unit program module 420 of the DS processing unit 410 at step 610 and persists the proposal in the data storage 450.

Still referring to FIG. 6, at step 620, the DS storage units 430-1, 430-2, . . . , 430-n determine a current timestamp based on a local absolute clock. In embodiments, the DS storage unit program module 440 of the DS storage units 430-1, 430-2, . . . , 430-n, in response to receiving the proposal from the DS processing unit 410 at step 610, determines a current timestamp Ts using the absolute clock 457. In embodiments, at step 620, the DS storage unit program module 440 of the DS storage units 430-1, 430-2, . . . , 430-n also determines clock skew based on the difference between Tc and Ts. In embodiments, in the event that |Ts−Tc| is larger than a predetermined maximum acceptable skew, the DS storage unit program module 440 of the DS storage units 430-1, 430-2, . . . , 430-n rejects the proposal P received at step 615 and refuses to vote for the proposal P.

Still referring to FIG. 6, at step 625, the DS storage units 430-1, 430-2, . . . , 430-n, when opening a new contest based on the proposal P received at step 615, set a vote for MIN-TIMESTAMP to a value stored in the read timestamp cache 458. In embodiments, the DS storage unit program module 440 of the DS storage units 430-1, 430-2, . . . , 430-n, in response to the proposal P received at step 615 not being a subject of an existing contest, opens a new contest based on the proposal P and sets a vote for MIN-TIMESTAMP to a value stored in the read timestamp cache 458 at an array index or other location corresponding to the source S.

Still referring to FIG. 6, at step 630, the DS storage units 430-1, 430-2, . . . , 430-n respond to the DS processing unit 410 with a contest list, the timestamp determined at step 620, and the MIN-TIMESTAMP determined at step 625. In embodiments, the DS storage unit program module 440 of the DS storage units 430-1, 430-2, . . . , 430-n responds to the DS processing unit program module 420 of the DS processing unit 410 with the contest list, the timestamp Ts determined at step 620, and the MIN-TIMESTAMP determined at step 625. In embodiments, the MIN-TIMESTAMP is the lowest timestamp for which the DS storage unit 430-1, 430-2, . . . , 430-n will vote.

Still referring to FIG. 6, at step 635, the DS processing unit 410 receives the responses from the DS storage units 430-1, 430-2, . . . , 430-n and calculates a new estimated clock offset. In embodiments, the DS processing unit program module 420 of the DS processing unit 410 receives the responses from the DS storage units 430-1, 430-2, . . . , 430-n sent at step 630, calculates a new estimated clock offset using the timestamps Ts in the responses, and updates the relative hybrid logical clock 427 using the new estimated clock offset.

Still referring to FIG. 6, at step 640, the DS processing unit 410 resolves the MIN-TIMESTAMP decision. In embodiments, the DS processing unit program module 420 of the DS processing unit 410 resolves the MIN-TIMESTAMP decision based on the responses received from the DS storage units 430-1, 430-2, . . . , 430-n at step 635, using a Paxos protocol or other voting protocol. In embodiments, if the DS processing unit program module 420 of the DS processing unit 410 is unable to resolve the MIN-TIMESTAMP decision, the DS processing unit program module 420 proposes a new MIN-TIMESTAMP, requests new responses from the DS storage unit program module 440 of the DS storage units 430-1, 430-2, . . . , 430-n, and then makes another attempt to resolve the MIN-TIMESTAMP decision based on the responses received from the DS storage units 430-1, 430-2, . . . , 430-n.

Still referring to FIG. 6, at step 645, the DS processing unit 410 resolves the WINNING-SUCCESSOR decision, taking into account the MIN-TIMESTAMP determined at step 640. In embodiments, the DS processing unit program module 420 of the DS processing unit 410 resolves the WINNING-SUCCESSOR decision based on the responses received from the DS storage units 430-1, 430-2, . . . , 430-n at step 635 and taking into account the MIN-TIMESTAMP determined at step 640, using a Paxos protocol or other voting protocol.

Still referring to FIG. 6, at step 650, the DS processing unit 410 and the DS storage units 430-1, 430-2, . . . , 430-n complete the write based on the WINNING-SUCCESSOR determined at step 645. In embodiments, the DS processing unit program module 420 of the DS processing unit 410 causes the DS storage unit program module 440 of the DS storage units 430-1, 430-2, . . . , 430-n to complete the write of the source S to the data storage 450 based on the WINNING-SUCCESSOR determined at step 645.

In embodiments, a system and method are provided for providing consistent reads in a CASN distributed transaction protocol, the method including the steps of: issuing, via a DS processing unit 410, multiple read requests with the same client timestamp (Tc); for each read request, issuing, via a grid layer, requests with the timestamp (Tc), and ensuring that either the highest revision less than or equal to (Tc) or an appropriate error is returned; and when a quorum of DS storage units 430-1, 430-1, . . . , 430-n cannot service a read at a particular timestamp because old data has already been discarded, aborting the transaction at the DS processing unit 410, and retrying the entire transaction.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving, by a dispersed storage (DS) processing unit in a dispersed storage network, a request to write a revision of a data object in the dispersed storage network, wherein the data object is stored as slices at a plurality of DS storage units in the dispersed storage network and the revision of the data object is a newer version of the data object;
sending, by the DS processing unit, a proposal with the revision of the data object to the plurality of DS storage units;
receiving, by the DS processing unit, a response to the proposal from each of the plurality of DS storage units, the response including a proposed minimum timestamp corresponding to the data object;
determining, by the DS processing unit, a minimum timestamp for the data object based on the proposed minimum timestamps received from the plurality of DS storage units;
determining, by the DS processing unit, a version of the data object written in the dispersed storage network based on the minimum timestamp; and
completing the write of the revision of the data object in the dispersed storage network based on the determined version.

2. The method according to claim 1, further comprising determining, by the DS processing unit, a current timestamp of the DS processing unit, and
wherein the proposal includes the current timestamp of the DS processing unit.

3. The method according to claim 2, wherein the response to the proposal received from each of the plurality of DS storage units further comprises a current timestamp of the DS storage unit.

4. The method according to claim 3, further comprising the DS processing unit using a Paxos protocol to determine the minimum timestamp based on the responses to the proposal received from the DS storage units.

5. The method according to claim 1, wherein the determining the version of the data object written in the dispersed storage network comprises determining a WINNING-SUCCESSOR using a Paxos protocol based on the responses to the proposal received from the DS storage units.

6. The method according to claim 5, wherein the completing the write of the revision of the data object is performed based on the WINNING-SUCCESSOR.

7. The method according to claim 1, wherein:
the DS processing unit comprises a relative system clock, a logical counter, and a relative hybrid logical clock;
the relative hybrid logical clock is a hybrid logical clock that provides ordering of events based on the relative system clock and the logical counter;
the DS processing unit determines a current timestamp for the write request using the relative hybrid logical clock; and
the DS processing using sends the current timestamp with the proposal.

8. A computer program product comprising:
one or more computer readable storage media, and program instructions collectively stored on the one or more computer readable storage media, the program instructions comprising:
program instructions to receive, by the DS processing unit in a dispersed storage network, a read request for a data object, wherein the data object is stored as slices at a plurality of DS storage units in the dispersed storage network, the read request includes a request timestamp, and the request is received from a client computer system;
program instructions to determine, by the DS processing unit, a current timestamp;
program instructions to retrieve, by the DS processing unit, data from storage corresponding to the data object at the request timestamp;
program instructions to update, by the DS processing unit, a read timestamp cache based on the current timestamp;
program instructions to provide, by the DS processing unit, the retrieved data to a dispersed storage (DS) processing unit; and
program instructions to generate, by the DS processing unit, a response to the read request and return the response to the client computer system.

9. The computer program product according to claim 8, wherein the updating the read timestamp cache comprises setting a value at an index corresponding to the data object to a maximum of a value presently stored at the index and the current timestamp.

10. The computer program product according to claim 8, further comprising program instructions to determine a difference between the request timestamp and the read timestamp.

11. The computer program product according to claim 10, further comprising program instructions to, in response to the difference between the request timestamp and the read timestamp exceeding a predetermined maximum acceptable skew, reject the read request.

12. The computer program product according to claim 8, wherein request timestamp is a hybrid logical clock timestamp.

13. The computer program product according to claim 8, wherein:
- the DS processing unit comprises a relative system clock, a logical counter, and a relative hybrid logical clock;
- the relative hybrid logical clock is a hybrid logical clock that provides ordering of events based on the relative system clock and the logical counter; and
- the DS processing unit determines the current timestamp using the relative hybrid logical clock.

14. A system comprising:
- a hardware processor, a computer readable memory, and one or more computer readable storage media associated with a computing device, wherein the computing device is a dispersed storage (DS) processing unit;
- program instructions to receive, by the DS processing unit in a dispersed storage network, a request to write a revision of a data object in the dispersed storage network, wherein the data object is stored as slices at a plurality of DS storage units in the dispersed storage network and the revision of the data object is a newer version of the data object;
- program instructions to send, by the DS processing unit, a proposal with the revision of the data object to the plurality of DS storage units;
- program instructions to receive, by the DS processing unit, a response to the proposal from each of the plurality of DS storage units, the response including a proposed minimum timestamp corresponding to the data object;
- program instructions to determine, by the DS processing unit, a minimum timestamp for the data object based on the proposed minimum timestamps received from the plurality of DS storage units;
- program instructions to determine, by the DS processing unit, a version of the data object written in the dispersed storage network based on the minimum timestamp; and
- program instructions to completing a write of the revision of the data object in the dispersed storage network based on the determined version, wherein the program instructions are collectively stored on the one or more computer readable storage media for execution by the hardware processor via the computer readable memory.

15. The system according to claim 14, further comprising program instructions to determine a current timestamp of the DS processing unit,
- wherein the proposal includes the current timestamp of the DS processing unit.

16. The system according to claim 15, wherein the response to the proposal received from each of the plurality of DS storage units further comprises a current timestamp of the DS storage unit.

17. The system according to claim 16, further comprising program instructions to use a Paxos protocol to determine the minimum timestamp based on the responses to the proposal received from the DS storage units.

18. The system according to claim 14, wherein the determining the version of the data object written in the dispersed storage network comprises determining a WINNING-SUCCESSOR using a Paxos protocol based on the responses to the proposal received from the DS storage units.

19. The system according to claim 18, wherein the plurality of completing the write of the revision of the data object is performed based on the WINNING-SUCCESSOR.

20. The system according to claim 14, wherein:
- the DS processing unit comprises a relative system clock, a logical counter, and a relative hybrid logical clock;
- the relative hybrid logical clock is a hybrid logical clock that provides ordering of events based on the relative system clock and the logical counter;
- the DS processing unit determines a current timestamp for the write request using the relative hybrid logical clock; and
- the DS processing using sends the current timestamp with the proposal.

\* \* \* \* \*